US007839528B2

United States Patent
Shitano et al.

(10) Patent No.: US 7,839,528 B2
(45) Date of Patent: Nov. 23, 2010

(54) INFORMATION ACQUIRING METHOD, INFORMATION APPENDING APPARATUS, INFORMATION ACQUIRING APPARATUS, AND PROGRAM

(75) Inventors: Masaki Shitano, Yokohama (JP); Kenichi Fujii, Yokohama (JP); Takashi Hirata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 11/746,788

(22) Filed: May 10, 2007

(65) Prior Publication Data

US 2007/0206222 A1  Sep. 6, 2007

Related U.S. Application Data

(63) Continuation of application No. PCT/JP2005/019205, filed on Oct. 19, 2005.

(30) Foreign Application Priority Data

Nov. 11, 2004   (JP)   ............................. 2004-327892

(51) Int. Cl.
*G06F 15/00* (2006.01)
*G06F 15/16* (2006.01)

(52) U.S. Cl. ..................... 358/1.15; 709/245

(58) Field of Classification Search ............... 358/1.15, 358/1.14, 1.13, 1.16, 1.18, 296, 1.9, 2.1, 358/3.23; 709/245, 241, 246, 234, 224, 203, 709/223; 455/134, 39, 522; 370/392, 474, 370/254; 382/154, 128, 131
See application file for complete search history.

(56) References Cited

U.S. PATENT DOCUMENTS

| 5,893,096 | A | 4/1999 | Nakamura | ................. 707/10 |
| 6,609,162 | B1 * | 8/2003 | Shimizu et al. | ............... 710/15 |
| 6,845,379 | B2 | 1/2005 | Ito et al. | .................... 707/102 |
| 2001/0030766 | A1 | 10/2001 | Yamamoto | ................. 358/1.15 |
| 2006/0155802 | A1 | 7/2006 | He et al. | .................... 709/203 |

FOREIGN PATENT DOCUMENTS

| JP | 58-161443 | 9/1983 |
| JP | 6-231174 | 8/1994 |
| JP | 10-207798 | 8/1998 |
| JP | 2000-187573 | 7/2000 |
| JP | 2001-257827 | 9/2001 |
| JP | 2002-073436 | 3/2002 |
| JP | 2004-505360 | 2/2004 |
| WO | WO 02/09384 A2 | 1/2002 |
| WO | WO 03098873 | 11/2003 |

OTHER PUBLICATIONS

PCT International Preliminary Report (May 15, 2007) from PCT/JP2005/019205.
UpnP Architecture 1.0 (downloaded Aug 2, 2007; document version 1.0.1, Jul. 20, 2006).

* cited by examiner

*Primary Examiner*—Saeid Ebrahimi Dehkordy
(74) *Attorney, Agent, or Firm*—Fitzpatrick, Cella, Harper & Scinto

(57) ABSTRACT

When a transmission source apparatus 100 wants information of another apparatus, it forwards a document to all apparatuses connected to a network. During the forwarding processing, the apparatus appends its information to the document. The transmission source apparatus 100 finally receives the document to acquire the information of another apparatus.

8 Claims, 9 Drawing Sheets

FIG. 4

```
<soap:Envelope
   xmlns:soap="http://schemas.xmlsoap.org/soap/envelope/"
   xmlns:xsi="http://www.w3.org/2001/XMLSchema-instance"
   xmlns:xsd="http://www.w3.org/2001/XMLSchema">
 <soap:Header>
  <wsrp:path
     soap:actor="http://schemas.xmlsoap.org/soap/actor/next"
     soap:mustUnderstand="1"
     xmlns:wsrp="http://schemas.xmlsoap.org/rp">
    <wsrp:action>http://tempuri.org/SearchDevice</wsrp:action>
    <wsrp:to>http://192.168.1.10/WSERouting/SearchDevice.sp</wsrp:to>  ~401
    <wsrp:fwd>  ~402
      <wsrp:via>http://192.168.1.11/WSERouting/a.sp</wsrp:via>
      <wsrp:via>http://192.168.1.12/WSERouting/b.sp</wsrp:via>
      <wsrp:via>http://192.168.1.13/WSERouting/c.sp</wsrp:via>
      <wsrp:via>http://192.168.1.14/WSERouting/a.sp</wsrp:via>
      <wsrp:via>http://192.168.1.15/WSERouting/a.sp</wsrp:via>
    </wsrp:fwd>
    <wsrp:rev />
    <wsrp:id>uuid:76c87c3a-03c6-4643-8bca-cf8ddec8beae</wsrp:id>  ~403
  </wsrp:path>
  <wsu:Timestamp
     xmlns:wsu="http://schemas.xmlsoap.org/ws/2002/07/utility">
     <wsu:Created>2003-01-27T06:19:33Z</wsu:Created>
     <wsu:Expires>2003-01-27T06:24:33Z</wsu:Expires>
  </wsu:Timestamp>
 </soap:Header>
 <soap:Body>  ~404
  <SearchDevice xmlns="http://tempuri.org/">
   <input>Printer</input>
  </SearchDevice>
 </soap:Body>
</soap:Envelope>
```

FIG. 5

```
500
<soap:Envelope
    xmlns:soap="http://schemas.xmlsoap.org/soap/envelope/"
    xmlns:xsi="http://www.w3.org/2001/XMLSchema-instance"
    xmlns:xsd="http://www.w3.org/2001/XMLSchema">
  <soap:Header>
    <wsrp:path
        soap:actor="http://schemas.xmlsoap.org/soap/actor/next"
        soap:mustUnderstand="1"
        xmlns:wsrp="http://schemas.xmlsoap.org/rp">
      <wsrp:action>http://tempuri.org/SearchDevice</wsrp:action>
      <wsrp:to>http://192.168.1.10/WSERouting/SearchDevice.sp</wsrp:to>
      <wsrp:fwd>
        <wsrp:via>http://192.168.1.12/WSERouting/b.sp</wsrp:via>
        <wsrp:via>http://192.168.1.13/WSERouting/c.sp</wsrp:via>
        <wsrp:via>http://192.168.1.14/WSERouting/a.sp</wsrp:via>
        <wsrp:via>http://192.168.1.15/WSERouting/a.sp</wsrp:via>
      </wsrp:fwd>
      <wsrp:rev>
        <wsrp:via>http://192.168.1.11/WSERouting/a.sp</wsrp:via>
      </wsrp:rev>
      <wsrp:id>uuid:76c87c3a-03c6-4643-8bca-cf8ddec8eae</wsrp:id>
    </wsrp:path>
    <wsu:Timestamp
        xmlns:wsu="http://schemas.xmlsoap.org/ws/2002/07/utility">
      <wsu:Created>2003-01-27T06:19:33Z</wsu:Created>
      <wsu:Expires>2003-01-27T06:24:33Z</wsu:Expires>
    </wsu:Timestamp>
  </soap:Header>
  <soap:Body>
    <SearchDevice xmlns="http://tempuri.org/">
      <input>Printer</input>
    </SearchDevice>
  </soap:Body>
</soap:Envelope>
<CirculationProfile>  ～501
  <StaticInformation>
    <Device>
      <Name>Printer</DeviceName>
      <FriendlyName>color printer</FriendlyName>
      <SerialNumber>UUID:123456789</SerialNumber>
      <Type>printer</Type>
    </Device>
    <Vender>
      <Name>XXXXX Inc.</Name>
      <Address>Ohta-ku, Tokyo 146-8501, Japan</Address>
      <Telephone>1234-5678</Telephone>
      <Email>aaa@xxxxx.co.jp</Email>
    </Vender>
    <Service name=PrintService>
      <Name>Print Service</Name>
      <Type>Print Service</Type>
    </Service>
  </StaticInformation>
  <API>
    <Interface service=PrintService>
      <APIVersion>1.0</APIVersion>
      <APIReference>http://aaa.com/printservice.wsdl</APIReference>
    </Interface>
  </API>
  <Status>
    <Power>on</Power>
    <State>idle</State>
    <PrintQuality>normal</PrintQuality>
    <MediaSize>A4</MediaSize>
    <ColorSupport>true</ColorSupport>
    <DocumentFormat>unknown</DocumentFormat>
  </Status>
</CirculationProfile>
```

FIG. 9

```
<soap:Envelope
   xmlns:soap="http://schemas.xmlsoap.org/soap/envelope/"
   xmlns:xsi="http://www.w3.org/2001/XMLSchema-instance"
   xmlns:xsd="http://www.w3.org/2001/XMLSchema">
 <soap:Header>
  <wsrp:path
     soap:actor="http://schemas.xmlsoap.org/soap/actor/next"
     soap:mustUnderstand="1"
     xmlns:wsrp="http://schemas.xmlsoap.org/rp">
   <wsrp:action>http://tempuri.org/SearchDevice</wsrp:action>
   <wsrp:to>http://192.168.1.10/WSERouting/SearchDevice.sp</wsrp:to>
   <wsrp:fwd>  ~701
     <wsrp:via>http://192.168.1.11/WSERouting/a.sp</wsrp:via>
     <wsrp:via>http://192.168.1.12/WSERouting/b.sp</wsrp:via>
   </wsrp:fwd>
   <wsrp:rev />
   <wsrp:id>uuid:76c87c3a-03c6-4643-8bca-cf8ddec8beae</wsrp:id>
  </wsrp:path>
  <wsu:Timestamp
     xmlns:wsu="http://schemas.xmlsoap.org/ws/2002/07/utility">
     <wsu:Created>2003-01-27T06:19:33Z</wsu:Created>
     <wsu:Expires>2003-01-27T06:24:33Z</wsu:Expires>
  </wsu:Timestamp>
 </soap:Header>
 <soap:Body>
  <SearchDevice xmlns="http://tempuri.org/">
    <input>Any</input>   ~702
  </SearchDevice>
 </soap:Body>
</soap:Envelope>
```

US 7,839,528 B2

INFORMATION ACQUIRING METHOD, INFORMATION APPENDING APPARATUS, INFORMATION ACQUIRING APPARATUS, AND PROGRAM

TECHNICAL FIELD

The present invention relates to an information acquiring method, information appending apparatus, information acquiring apparatus, and program.

BACKGROUND ART

With the prevalence of networks in recent years, not only personal computers but also various products such as portable phones, electronic apparatuses, and so-called digital household appliances can be connected to networks. Environments in which electronic apparatuses are used in cooperation extend not only to office use but also to home use. Household appliances and other products which so far have been used independently are now connected to networks.

Under these circumstances, easy connection, setting and control are required for various apparatuses to be connected to networks. Particularly in ad hoc environments such as a home network and hot spot, such requirements are significant since those who connect or set various apparatuses are not always experts of networks or electronic apparatus techniques.

Examples of network techniques that can meet such requirements include Universal Plug and Play (UPnP), BMLinkS, Rendezvous, Jini®, Jxta®, and HAVi. These techniques facilitate setups, settings, and addition of apparatuses connected to networks, and make it possible to detect and control services and network devices such as network printers, Internet gateways, and household appliances.

With these techniques apparatuses exchange, as profile information with each other, information of a device name, manufacturer, version, ID, and the like or information of interfaces and the like for using the services, thereby enabling the detection and control (e.g., see non-patent reference 1).

There also exists an apparatus which is equipped with a conversion gateway for combining the above-mentioned various techniques based on different standards (e.g., see patent reference 1).

Patent reference 1: Japanese Patent Laid-Open No. 2004-505360

Non-patent reference 1: UPnP Device Architecture Version 1.0.

DISCLOSURE OF INVENTION

Problems that the Invention is to Solve

In a conventional system for exchanging profile information between apparatuses, when exchanging profile information, the apparatuses must use identical profile exchange protocols in a one-to-one correspondence. When one apparatus wants to pick up an apparatus having a desired function, it executes a one-to-one profile exchange for all the apparatuses connected to a network. With reference to the obtained profile information of the apparatuses, an apparatus having the desired function is picked up. A lot of processes are necessary to pick up the apparatus and the efficiency decreases. Also, the network traffic increases. Consequently, the processing speed of the overall system is highly likely to decrease.

The apparatuses exchange profile information with each other in a one-to-one correspondence. Consequently, it is impossible to derive mutual association or cooperation between all the apparatuses connected via the network. That is, it is difficult to meet a requirement to execute a series of processes (copy processes) by combining an apparatus having a certain function (e.g., a printer function) and an apparatus having another function (e.g., a scanner function).

The present invention has been made in consideration of the above problems, and has as its object to provide an information acquiring method, information appending apparatus, information acquiring apparatus, and program for making it possible to quickly collect information of apparatuses with a simple process.

It is another object of the present invention to provide an information acquiring method, information appending apparatus, and program for making it possible to inform a user that a process obtained by combining functions of a plurality of apparatuses is available.

Means of Solving the Problems

According to the present invention, an information acquiring method applied to a system that includes an information acquiring apparatus and a plurality of apparatuses which are connected to each other via a network, comprises a first transmission step of transmitting a document, which is received at a first apparatus after being forwarded to the plurality of apparatuses, from the information acquiring apparatus to a first apparatus of the plurality of apparatuses, a transfer step of sequentially transferring the document to the first to last apparatuses of the plurality of apparatuses, a second transmission step of transmitting the document from the last apparatus of the plurality of apparatuses to the information acquiring apparatus, and an appending step, executed by the plurality of apparatuses, of appending information of a self-apparatus to the received document.

According to the present invention, an information appending apparatus for appending information to a document which is received at a transmission source after being forwarded to a plurality of apparatuses via a network, comprises an appending unit adapted to append information of a self-apparatus to the received document, and a transmission unit adapted to transmit the document, to which the information has been appended by the appending unit, to another apparatus of the plurality of apparatuses.

According to the present invention, an information acquiring apparatus, connected to a plurality of apparatuses via a network, for acquiring information of the plurality of apparatuses, comprises a creation unit adapted to create a document configured to be received at the information acquiring apparatus after being forwarded to the plurality of apparatuses, and a transmission unit adapted to transmit the document created by the creation unit to one of the plurality of apparatuses.

According to the present invention, a program that causes a computer to execute an information appending method for appending information to a document which is received at a transmission source after being forwarded to a plurality of apparatuses via a network, comprises a reception step of receiving the document, an appending step of appending information of a self-apparatus to the received document, and a transmission step of transmitting the document, to which the information has been appended in the appending step, to another apparatus of the plurality of apparatuses.

According to the present invention, a program that causes a computer, which is connected to a plurality of apparatuses via a network, to execute an information acquiring method for acquiring information of the plurality of apparatuses, comprises a creation step of creating a document configured to be received at the computer after being forwarded to the plurality of apparatuses, and a transmission step of transmitting the document created in the creation step to one of the plurality of apparatuses.

Effects of the Invention

According to the present invention, it is possible to quickly collect information of a plurality of apparatuses.

It is possible to reduce network traffic.

The processing efficiency of an overall system increases.

It is possible to acquire profile information of another apparatus having a specific function by designating the specific function in a document.

Furthermore, the respective functions of a plurality of apparatuses independent of each other are associated with each other by appending, to a received document, a function obtained by combining the information of the plurality of apparatuses. This makes it possible to use the plurality of apparatuses in cooperation as a new function.

Other effects of the present invention will become apparent from the following explanation of embodiments.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 4 is a view showing an example of a profile information document before collecting profile information of the apparatuses;

FIG. 5 is a view showing a profile information document created by an apparatus which receives the profile information document shown in FIG. 4;

FIG. 9 is a view showing an example of a profile information document in the second embodiment before collecting profile information of the apparatuses.

BEST MODE FOR CARRYING OUT THE INVENTION

The best mode for carrying out the present invention will be described below with reference to the accompanying drawings.

First Embodiment

Figure 1:
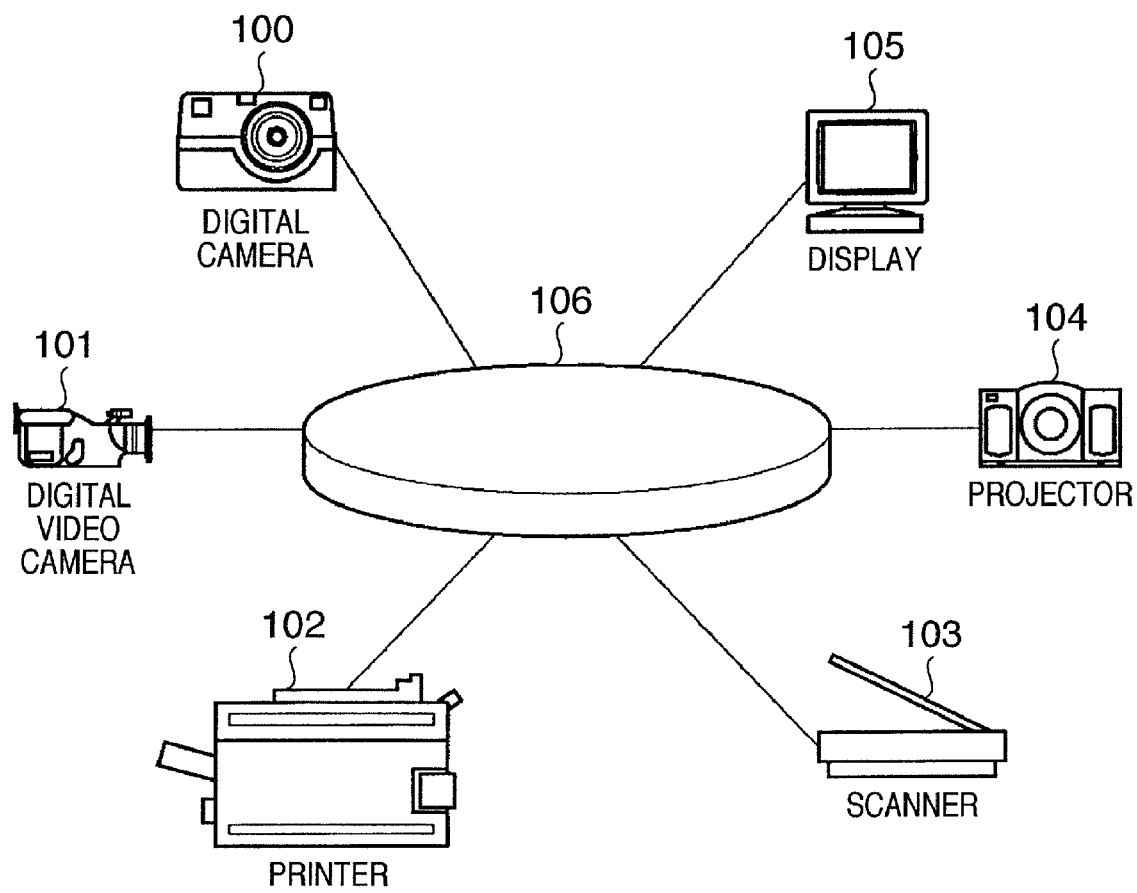
FIG. 1 is a view showing the overall configuration of a profile exchange system according to the first embodiment of the present invention.

FIG. 1 is a view showing the overall configuration of a profile exchange system according to the first embodiment of the present invention. The profile exchange system consists of a network to which a plurality of apparatuses are connected.

As shown in FIG. 1, the profile exchange system comprises a digital camera 100, digital video camera 101, printer 102, scanner 103, projector 104, and display 105 which are connected to a network 106. Although the profile exchange system in the first embodiment consists of these apparatuses, it is not limited to this configuration.

Each apparatus mentioned above has an information processing function, data holding function, and the like, thus enabling execution of a control program. In addition, each apparatus has a communication function and profile exchange control function.

Each apparatus mentioned above has, for example, a communication function of UPnP (Universal Plug and Play).

Figure 2:
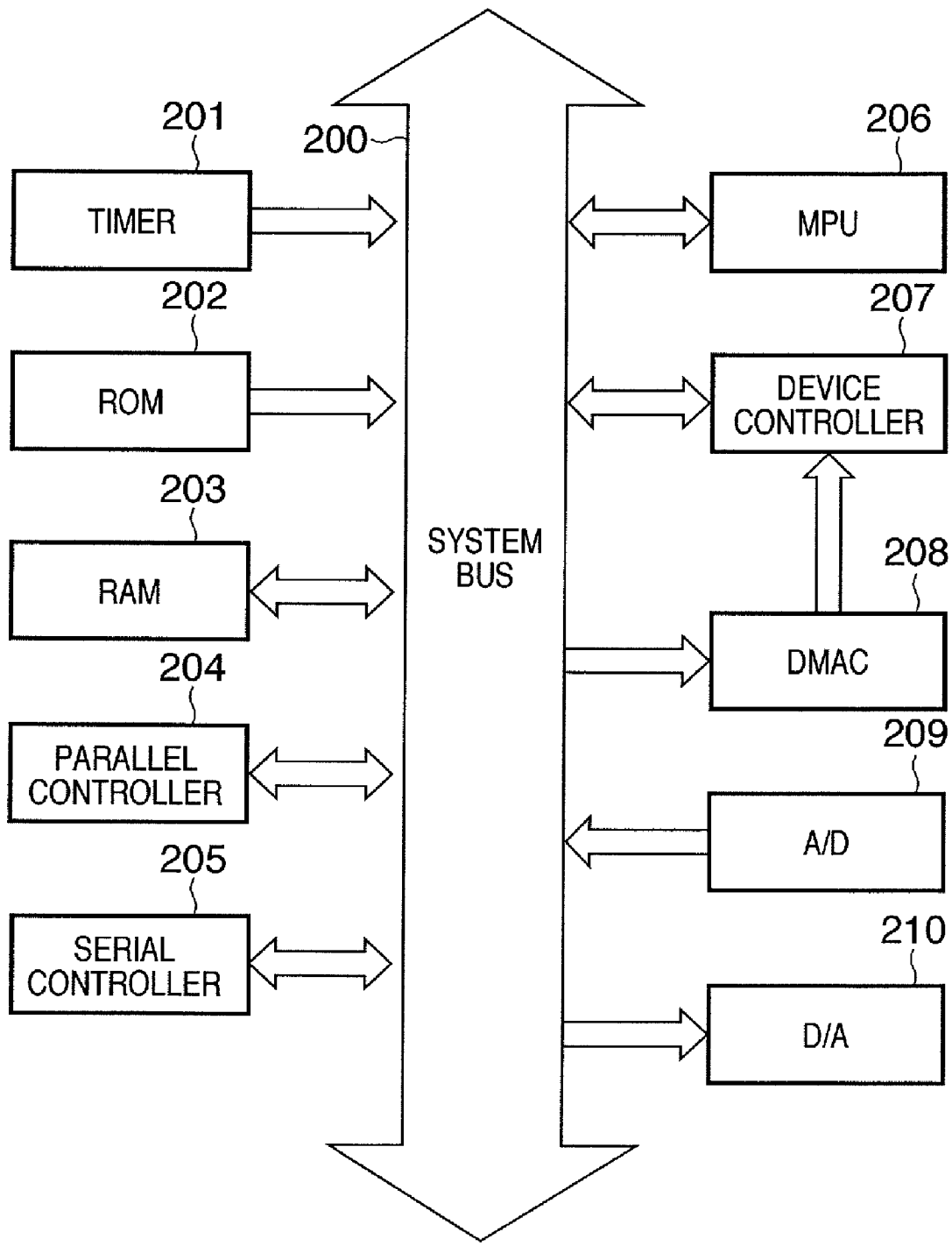
FIG. 2 is a block diagram showing an example of the hardware configuration common to apparatuses which constitute the profile exchange system shown in FIG. 1.

FIG. 2 is a block diagram showing an example of the hardware configuration common to the apparatuses which constitute the profile exchange system shown in FIG. 1.

Reference numeral 200 denotes an input/output bus (an address bus, data bus, and control bus) for connecting units.

Reference numeral 201 denotes a timer that has a function of generating an interrupt at designated time intervals. The timer 201 also has a so-called watchdog timer function and timepiece function.

Reference numeral 202 denotes a ROM (Read Only Memory) that has a function of storing codes of a program and fixed data kept unchanged.

Reference numeral 203 denotes a RAM (Random Access Memory) that has a function as a main memory, and as an area for execution programs, and an execution area and data area of these programs.

Reference numeral 204 denotes a parallel controller that has a function of inputting/outputting parallel data handled within the hardware to/from external apparatuses without any change.

Reference numeral 205 denotes a serial controller that has a function of outputting, as serial data, parallel data handled within the hardware, and converting and inputting serial data into parallel data.

Reference numeral 206 denotes an MPU (Micro Processor Unit) that has a function of sequentially executing program instructions and a function of controlling interrupts.

Reference numeral 207 denotes a device controller that has a function of connecting typical external input/output devices such as a hard disk and display.

Reference numeral 208 denotes a DMAC (Direct Memory Access Controller) that has a function of controlling direct data passing between a memory and an external apparatus.

Reference numeral 209 denotes an A/D (Analog to Digital) converter that has a function of converting analog data into digital data and a function of converting an amount sensed by a sensor or the like into numerical data.

Reference numeral 210 denotes a D/A (Digital to Analog) converter that has a function of converting digital data to analog data and a function of converting a manipulation amount output to an external actuator or the like into an analog signal.

A profile exchange control device 310 according to the present invention is implemented in the apparatus, such as the digital camera 100, digital video camera 101, printer 102, or scanner 103, shown in FIG. 1. The profile exchange control device 310 will be explained below. Note that the profile exchange control device 310 may be a function implemented by the hardware shown in FIG. 2.

Figure 3:
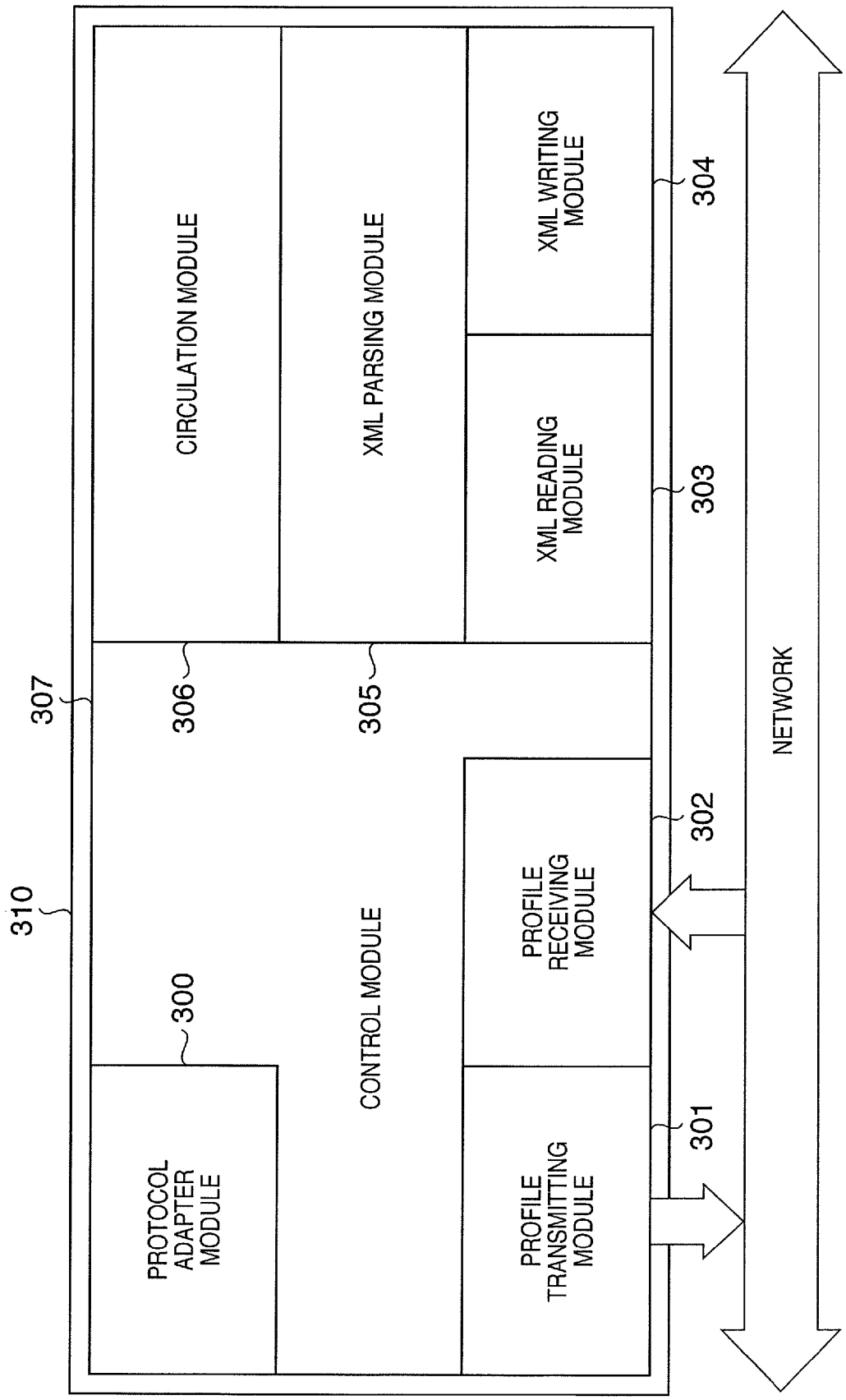
FIG. 3 is a block diagram showing the configuration of a profile exchange control device.

FIG. 3 is a block diagram showing the configuration of the profile exchange control device 310.

The profile exchange control device 310 comprises a protocol adapter module 300, profile transmitting module 301, profile receiving module 302, XML reading module 303, XML writing module 304, XML parsing module 305, circulation module 306, and control module 307.

The protocol adapter module 300 has a function of controlling, for example, a UPnP protocol or Jini protocol, which is implemented in the corresponding apparatus (the apparatus equipped with the profile exchange control device 310). The protocol adapter module 300 also has a function of acquiring and outputting a message. The protocol adapter module 300 serves as an interface between the profile exchange control device 310 and the protocol implemented in the apparatus (the apparatus equipped with the profile exchange control device 310).

The profile transmitting module 301 has a function of transmitting a profile information document (to be described later) to an external apparatus through a network.

The profile receiving module 302 has a function of receiving the profile information document from an external apparatus through the network.

The XML reading module 303 has a function of reading, from a file or the like, a document to be parsed by the XML parsing module 305 (to be described later).

The XML writing module 304 has a function of writing a document parsed by the XML parsing module 305 (to be described later) into a file or the like.

The XML parsing module 305 has a function of parsing an XML document, that is, a function of converting a document into a form accessible to application software. The XML parsing module 305 also has a function of verifying the accuracy of contents based on a schema such as a DTD, and of creating and editing an XML document.

The circulation module 306 has a function of acquiring information from the parsed document to determine its contents. Furthermore, the circulation module 306 has a function of editing and creating a document by using the editing function of the XML parsing module 305 based on the acquired information.

The control module 307 has a function of controlling the protocol adapter module 300, profile transmitting module 301, profile receiving module 302, XML reading module 303, XML writing module 304, XML parsing module 305, and circulation module 306.

The above-mentioned profile information document will now be explained.

FIG. 4 is a view showing an example of a profile information document 400 before collecting profile information of apparatuses.

The profile information document 400 in FIG. 4 describes information necessary for forwarding the profile information document 400 to each apparatus and information of an apparatus required to send its profile information.

The main items will be described below.

The end point URL of an apparatus (a transmission source) which transmits the profile information document 400 first is written in <wsrp:to> 401. This is because the profile information document 400 is forwarded and circulated to each apparatus, and finally received at the transmission source.

The end points of the apparatuses to which the profile information document 400 should be forwarded are sequentially written in <wsrp:fwd> 402. In this example, the URLs of five apparatuses are written, and the profile information document will be sequentially forwarded to each of the five apparatuses from the top (i.e., from the first apparatus to the second one, from the second one to the third one, and so forth).

An identifier (ID) uniquely assigned to the profile information document 400 is written in <wsrp:id> 403.

In addition, the profile information document 400 describes its creation date/time and expiration time.

After <soap:Body> 404, <SearchDevice> describes information indicating that the document is for requesting the transmission of profile information, and <input> describes a function of an apparatus to be requested to transmit its profile information. In this example, since "Printer" is written in <input>, the document requests profile information of an apparatus having a printer function.

FIG. 5 is a view showing a profile information document 500 created by an apparatus which has received the profile information document 400 shown in FIG. 4.

The profile information document 500 is an example document into which an apparatus (the printer 102), that has received the profile information document 400 forwarded from an apparatus (the URL of which is written in <wsrp:to> 401 and which is, for example, the digital camera 100) requesting the transmission of profile information, writes its profile information.

The profile information of its own is appended to the forwarded profile information document 400. That is, in the example shown in FIG. 5, <CirculationProfile> 501 describes the profile information of the apparatus (the printer 102) which matches "Printer" written in <input> of the profile information document 400.

In the profile information document 500, the end point of the apparatus itself written in <wsrp:fwd> is deleted. The end point of the apparatus itself is added to an element of <wsrp:rev>. In this example, it is written as an element of <wsrp:via>. This allows the apparatus, that has received the profile information document 500, to recognize a next destination to which it should forward the document.

In this way, the profile information document is reliably forwarded to all the apparatuses written in the elements of <wsrp:fwd>. The apparatus (the digital camera 100) which has requested the transmission of the profile information finally receives the profile information document.

A profile exchange executed in the profile exchange control device 310 shown in FIG. 3 will now be explained with reference to FIG. 6.

Figure 6:
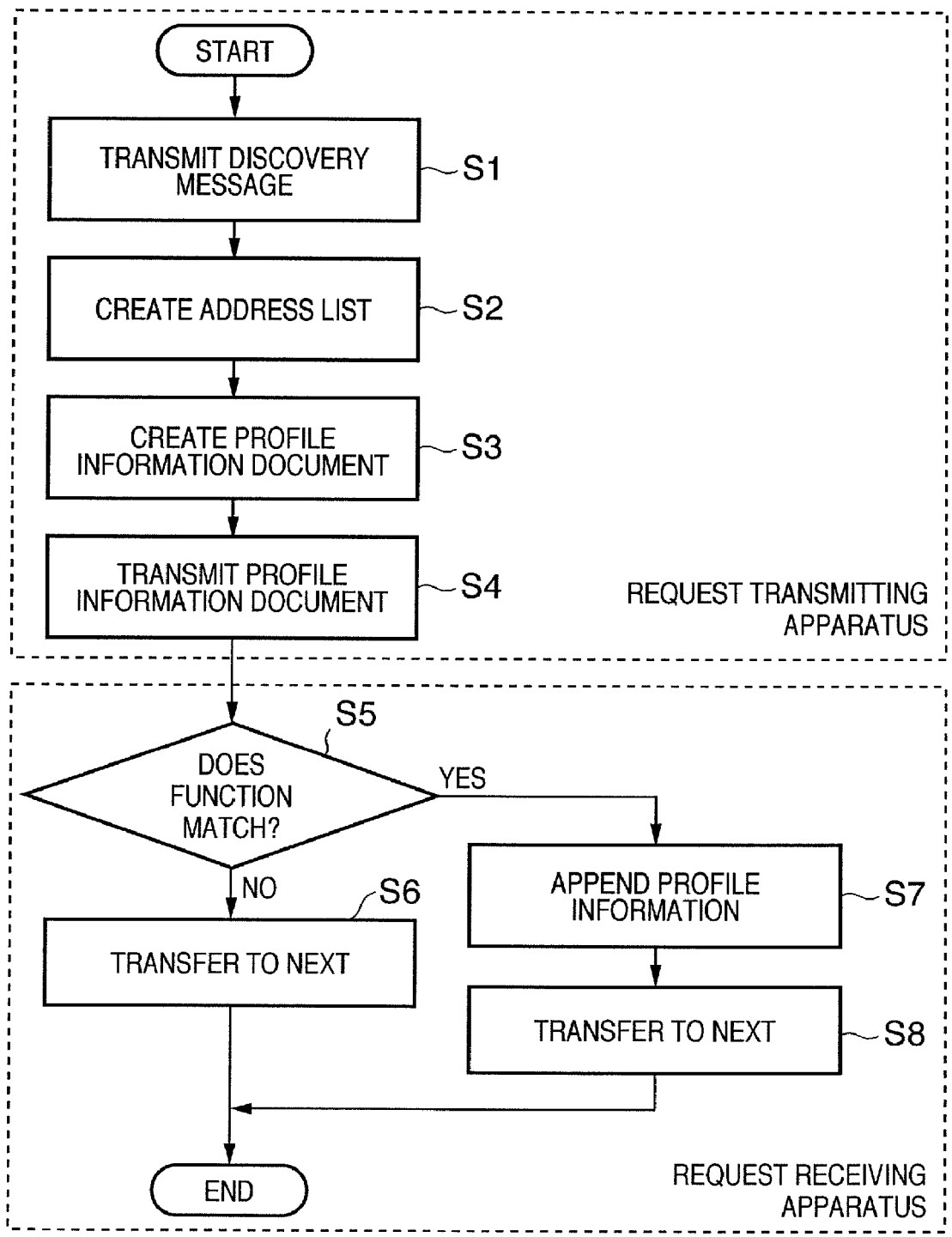
FIG. 6 is a flowchart showing the procedure of a profile information collection and transmission process executed in a profile exchange control device of each apparatus.

FIG. 6 is a flowchart showing the procedure of a profile information collection and transmission process executed in the profile exchange control device 310 of each apparatus.

In this case, assume that the digital camera 100 causes the printer 102 to print out an image stored within itself. Furthermore, assume that a UPnP protocol is implemented in each apparatus shown in FIG. 1 so as to allow easy understanding of the explanation of the process.

In the digital camera 100, a control module 307 transmits, to a protocol adapter module 300, a discovery message which requests the protocol adapter module 300 to list the addresses of all the apparatuses connected to the network 106 (S1). According to the discovery message, the protocol adapter module 300 creates an address list for all the apparatuses connected to the network 106, and transmits it to the control module 307 (S2). Based on the discovery message, the protocol adapter module 300, for example, transmits a broadcast message to all the apparatuses connected to the network 106, and creates a cache for the transmission result. The control module 307 acquires the cache to obtain the address list.

The control module 307 designates, to a circulation module 306, the obtained address list and "Printer" indicating an apparatus function necessary for printing. The circulation module 306 creates the profile information document 400 as shown in FIG. 4 by using an XML parsing module 305 (S3).

In <wsrp:fwd> 402 of the profile information document 400, the addresses listed in the address list are sequentially written as the end points of the apparatuses to which the profile information document 400 should be forwarded. The profile information document 400 is configured to be received by the self-apparatus (the digital camera 100) after being forwarded to the plurality of apparatuses as described above.

The control module 307 acquires the profile information document 400 created by the circulation module 306. The control module 307 then uses a profile transmitting module 301 to transmit the profile information document 400 to the apparatus indicated by "<wsrp:via>http://192.168.1.11/WSERouting/a.sp</wsrp:via>" at the head of <wsrp:fwd> 402 (S4).

Assume that "<wsrp:via>http://192.168.1.11/WSERouting/a.sp</wsrp:via>" corresponds to the video camera 101; "<wsrp:via>http://192.168.1.12/WsERouting/b.sp</wsrp:via>", the printer 102; "<wsrp:via>http://192.168.1.13/WSERouting/c.sp</wsrp:via>", the scanner 103; "<wsrp:via>http://192.168.1.14/WSERouting/a.sp</wsrp:via>", the projector 104; and "<wsrp:via>http://192.168.1.15/WSERouting/a.sp</wsrp:via>", the display 105. In this case, the following process is executed.

In the video camera 101, a profile receiving module 302 receives the profile information document 400 transmitted from the digital camera 100 and an XML writing module 304 writes it in a file or the like. An XML reading module 303 reads out the profile information document 400 and an XML parsing module 305 parses and transmits it to a circulation module 306.

The circulation module 306 searches for the <input> element as a child element of <SearchDevice> in the profile information document 400, and compares it with its own apparatus function (S5). Consequently, the circulation module 306 determines that its own apparatus (the video camera 101) does not have a printing function (No in S5). The circulation module 306 instructs the XML parsing module 305 to delete its own entry from <wsrp:fwd> 402 in the profile information document 400 and add the deleted entry as a child element of <wsrp:rev>.

The circulation module 306 acquires and holds, from a child element of <wsrp:fwd> 402, a next transmission destination to which the profile information document 400 is to be transmitted.

When the above process ends, the circulation module 306 instructs the XML writing module 304 to write the changes into the profile information document 400.

Upon completion of writing the changes, the circulation module 306 transmits the profile information document 400 and the next transmission destination (the end point URL of the apparatus) held as described above to a control module 307. The control module 307 instructs a profile transmitting module 301 to transmit the profile information document 400 to the next transmission destination (the printer 102) (S6).

This process then ends for the digital video camera 101.

Although not shown in FIG. 6, if a request receiving apparatus is designated as the next transfer destination in the profile information document 400, the request receiving apparatus executes the processing in step S5 and thereafter. If a request transmitting apparatus is designated as the next transfer destination, the profile information document 400 is transmitted to the request transmitting apparatus and the process ends.

In this example, since the profile information document 400 designates the printer 102 as the next transfer destination, the printer 102 executes the processing in step S5 and thereafter.

That is, the printer 102 which has received the profile information document 400 receives the profile information document 400 from a profile receiving module 302 as for the digital video camera 101. The profile information document 400 is then transmitted to a circulation module 306.

The circulation module 306 searches for the <input> element as a child element of <SearchDevice> in the profile information document 400, and compares it with its own apparatus function (S5). Consequently, the circulation module 306 determines that its own apparatus (the printer 102) has a printing function (YES in S5). At this time, the circulation module 306 instructs an XML parsing module 305 to append profile information of the printer 102 to the profile information document 400 (S7). Furthermore, the circulation module 306 instructs the XML parsing module 305 to delete its own entry from <wsrp:fwd> 402 in the profile information document 400 and add the deleted entry as a child element of <wsrp:rev>.

The circulation module 306 acquires and holds, from a child element of <wsrp:fwd> 402, a next transmission destination to which the profile information document 400 is to be transmitted.

When the above process ends, the circulation module 306 instructs an XML writing module 304 to write the changes into the profile information document 400.

Upon completion of writing the changes, the circulation module 306 transmits the profile information document 400 and the next transmission destination (the end point URL of the apparatus) held as described above to a control module 307. The control module 307 instructs a profile transmitting module 301 to transmit the profile information document 400 to the next transmission destination (the scanner 103) (S8).

This process then ends for the printer 102.

Although the processing after step S8 is not shown in FIG. 6, if a request receiving apparatus is designated as the next transfer destination in the profile information document 400, the request receiving apparatus executes the processing in step S5 and thereafter. If a request transmitting apparatus is designated as the next transfer destination, the profile information document 400 is transmitted to the request transmitting apparatus and the process ends.

In this example, the profile information document 400 designates the scanner 103, projector 104, and display 105 as the next transfer destinations. They independently execute the same processing as the above-described one in the digital video 102. That is, the profile information document is sequentially transferred to the first to last ones of a plurality of apparatuses. The display 105 as the last apparatus transmits the profile information document 400 to the digital camera 100 as the transmission source.

As described above, in the first embodiment, when an apparatus (a transmission source apparatus) wants profile information of another apparatus having a specific function, a profile information document designating the specific function is forwarded to a plurality of apparatuses connected to a network. That is, the profile information document is sequentially transferred to the first to last ones of the plurality of apparatuses. During the forwarding processing, the apparatus having the specific function appends its profile information to the profile information document. By forwarding the profile information document to the transmission source apparatus, the transmission source apparatus can acquire the profile information of another apparatus having the specific function. That is, it is unnecessary to execute a one-to-one profile exchange with all other apparatuses connected to the network, and thus in the first embodiment, it is possible to quickly collect profile information with a simple process.

This makes it possible to reduce the network traffic and the processing efficiency of the overall system increases.

Second Embodiment

The second embodiment of the present invention will now be explained.

In the above-described first embodiment, the profile information document 400 designates a specific function (e.g., a printer function) and profile information of an apparatus having the specific function is collected. In contrast to this, in the second embodiment, a function type is not limited and profile information of all the apparatuses connected to the network 106 is collected. There is also provided profile information of a virtual apparatus that has a new function (a copy function) obtained by combining the functions (e.g., a printer function and scanner function) of the plurality of apparatuses.

Figure 7:
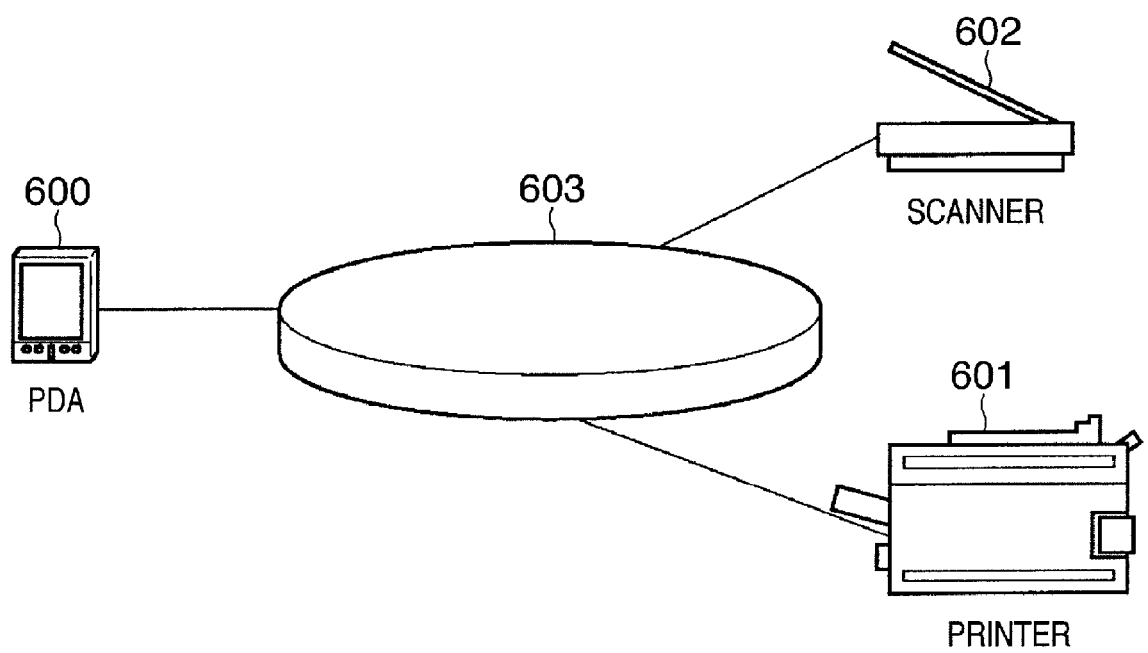
FIG. 7 is a view showing the configuration of a profile exchange system according to the second embodiment.

FIG. 7 is a view showing the configuration of a profile exchange system according to the second embodiment. The profile exchange system consists of a network to which a plurality of apparatuses is connected.

As shown in FIG. 7, the profile exchange system comprises a PDA (Personal Digital Assistant) 600, printer 601, and scanner 602 which are connected to a network 603. Although the profile exchange system according to the second embodiment consists of these apparatuses, it is not limited to this configuration.

Each apparatus mentioned above has an information processing function, data holding function, and the like, thus enabling execution of a control program. In addition, each apparatus has a communication function and profile exchange control function.

Each apparatus mentioned above has, for example, a communication function of UPnP (Universal Plug and Play).

A profile exchange control device having the same configuration as that of the profile exchange control device 310 in the first embodiment shown in FIG. 3 is implemented in the apparatus, such as the PDA 600, printer 601, or scanner 602, shown in FIG. 7. In the following description of the second embodiment, the configuration of the profile exchange control device 310 shown in FIG. 3 is reused.

Figure 8:
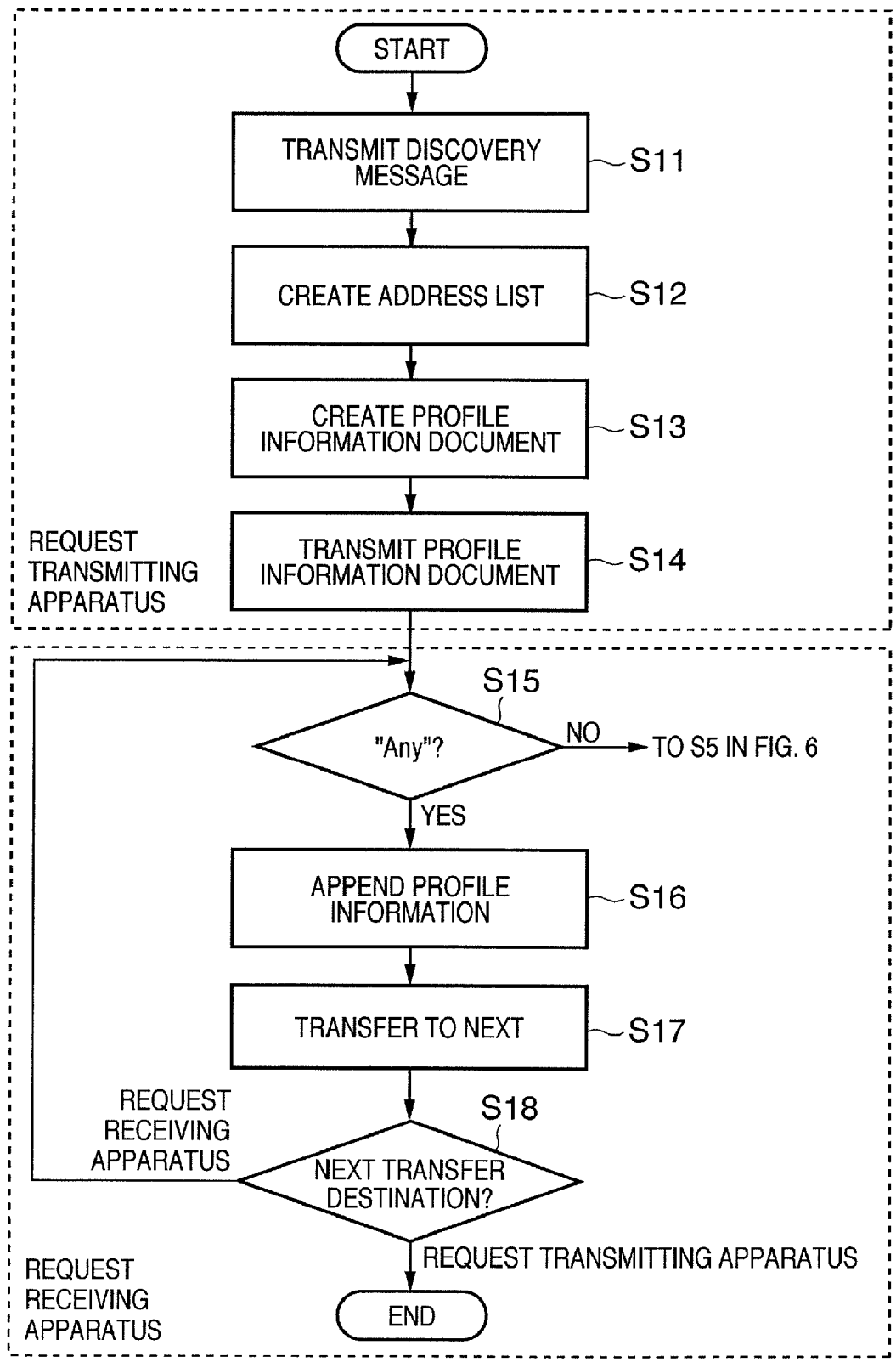
FIG. 8 is a flowchart showing the procedure of a profile information collection and transmission process executed in a profile exchange control device of each apparatus according to the second embodiment.

FIG. 8 is a flowchart showing the procedure of a profile information collection and transmission process executed in the profile exchange control device of each apparatus according to the second embodiment.

Assume that a UPnP protocol is implemented in each apparatus shown in FIG. 7 so as to allow easy understanding of the description of the process.

In the PDA 600, a control module 307 transmits, to a protocol adapter module 300, a discovery message which requests the protocol adapter module 300 to list the addresses of all the apparatuses connected to the network 603 (S11). According to the discovery message, the protocol adapter module 300 creates an address list for all the apparatuses connected to the network 603, and transmits it to the control module 307 (S12). Based on the discovery message, the protocol adapter module 300, for example, transmits a broadcast message to all the apparatuses connected to the network 603, and creates a cache for the transmission result. The control module 307 acquires the cache to obtain the address list.

The control module 307 designates, to a circulation module 306, the obtained address list and "Any" which indicates no specific function and requests all the apparatuses connected to the network 603 to transmit their profile information to the request transmission source. The circulation module 306 creates a profile information document 700 as shown in FIG. 9 by using an XML parsing module 305 (S13).

FIG. 9 is a view showing an example of the profile information document 700 in the second embodiment before collecting profile information of the apparatuses.

In <wsrp:fwd> 701 of the profile information document 700, addresses listed in the address list are sequentially written as the end points of apparatuses to which the profile information document 700 should be forwarded. In <input> 702 indicating an apparatus requested to transmit its profile information, "Any" is written. The profile information document 700 is configured to be received at the self-apparatus (the digital camera 100) after being forwarded to the plurality of apparatuses as described above.

The control module 307 acquires the profile information document 700 created by the circulation module 306. The control module 307 then uses a profile transmitting module 301 to transmit the profile information document 700 to the apparatus indicated by "<wsrp:via>http://192.168.1.11/WSERouting/a.sp</wsrp:via>" at the head of <wsrp:fwd> 701 (S14).

Assume that "<wsrp:via>http://192.168.1.11/WSERouting/a.sp</wsrp:via>" corresponds to the printer 601 in FIG. 7, and that "<wsrp:via>http://192.168.1.12/WSERouting/b.sp</wsrp:via>" corresponds to the scanner 602. In this case, the following process is executed.

In the printer 601, a profile receiving module 302 receives the profile information document 700 transmitted from the PDA 600 and an XML writing module 304 writes it in a file or the like. An XML reading module 303 reads out the profile information document 700 and an XML parsing module 305 parses and transmits it to the circulation module 306.

The circulation module 306 searches for <input> 702 as a child element of <SearchDevice> in the profile information document 700, and determines whether "Any" is written or not (S15). Consequently, if "Any" is written, the process advances to step S16; otherwise, the process advances to the same processing (not shown) as that in step S5 and thereafter in the first embodiment shown in FIG. 6.

In step S16, the circulation module 306 instructs the XML parsing module 305 to append profile information of the printer 601 to the profile information document 700 (S16). Furthermore, the circulation module 306 instructs the XML parsing module 305 to delete its own entry from <wsrp:fwd> 701 in the profile information document 700 and add the deleted entry as a child element of <wsrp:rev>.

The circulation module 306 acquires and holds, from a child element of <wsrp:fwd> 701, a next transmission destination to which the profile information document 700 is to be transmitted.

When the above process ends, the circulation module 306 instructs the XML writing module 304 to write the changes into the profile information document 700.

Upon completion of writing the changes, the circulation module 306 transmits the profile information document 700 and the next transmission destination (the end point URL of the apparatus) held as described above to the control module 307. The control module 307 instructs a profile transmitting module 301 to transmit the profile information document 700 to the next transmission destination (the scanner 602) (S17).

This process then ends for the printer 601.

It is determined whether an apparatus designated as the next transfer destination is a request receiving apparatus or a request transmitting apparatus (S18). If it is a request receiving apparatus, the process returns to step S15. If a request transmitting apparatus is designated as the next transfer destination, the profile information document 700 is transmitted to the request transmitting apparatus and the process ends.

In this example, since the profile information document 700 designates the scanner 602 as the next transfer destination, the scanner 602 executes the processing in step S15 and thereafter.

That is, the scanner 602 which has received the profile information document 700 transmits the profile information document 700 to a circulation module 306 as for the printer 601. The circulation module 306 searches for <input> 702 as a child element of <SearchDevice> in the profile information document 700, and determines whether "Any" is written or not (S15). Consequently, if "Any" is written, the process advances to step S16. The circulation module 306 instructs an XML parsing module 305 to append profile information of the scanner 602 to the profile information document 700. That is, in this example, the circulation module 306 instructs the XML parsing module 305 to add the profile information after that of the printer 601 which has already written in the profile information document 700 (S16). Furthermore, the circulation module 306 instructs the XML parsing module 305 to delete its own entry from <wsrp:fwd> 701 in the profile information document 700 and add the deleted entry as a child element of <wsrp:rev>.

The circulation module 306 refers to the received profile information document 700 to determine that another apparatus has already appended its profile information to the profile information document 700. If such determination is made, the circulation module 306 uses the XML parsing module 305 to parse the appended profile information. Consequently, in this example, the apparatus corresponding to the already appended profile information has a printing function.

The circulation module 306 determines that it can provide a virtual copying machine function by combining the printer function of the printer 601 and the scanner function of the scanner 602, since its own corresponding apparatus is a scanner. The circulation module 306 then instructs the XML parsing module 306 to append profile information indicating the virtual copying machine function to the profile information document 700.

The circulation module 306 transmits the profile information document 700 and the next transmission destination to a control module 307. The control module 307 instructs a profile transmitting module 301 to transmit the profile information document 700 to the next transmission destination (S17).

The process ends for the scanner 602.

In this example, the request transmitting apparatus (the PDA 600) is designated as the next transfer destination in the profile information document 700. Therefore, the profile information document 700 is transmitted to the request transmitting apparatus and the process ends.

As described above, in the second embodiment, when an apparatus (a transmission source apparatus) wants profile information of a plurality of apparatuses, a profile information document designating such request is forwarded to the plurality of apparatuses connected to a network. During the forwarding processing, each apparatus adds its profile information to the profile information document. In the second embodiment, by forwarding the profile information document to the transmission source apparatus, the transmission source apparatus can associate, with each other, the respective functions of a plurality of apparatuses independent of each other apparatus. This makes it possible to use the plurality of apparatuses in cooperation as a new function.

Other Embodiments

The object of the present invention is also achieved when a storage medium which records software program codes for implementing the functions of the above-described embodiments is supplied to a system or apparatus, and the computer (or the CPU or MPU) of the system or apparatus reads out and executes the program codes stored in the storage medium.

In this case, the program codes read out from the storage medium implement new functions of the present invention, and the storage medium which stores the program codes and the program constitutes the present invention.

The storage medium for supplying the program codes includes a flexible disk, hard disk, optical disk, magnetooptical disk, CD-ROM, CD-R, CD-RW, DVD-ROM, DVD-RAM, DVD-RW, DVD+RW, magnetic tape, nonvolatile memory card, and ROM. The program may be downloaded from another computer or database connected to the Internet, commercial network, or local area network.

The functions of the above-described embodiments are implemented when the computer executes the readout program codes. Also, the functions of the above-described embodiments are implemented when an OS (Operating System) or the like running on the computer performs some or all of actual processes based on the instructions of the program codes.

Furthermore, the present invention includes a case in which, after the program codes read out from the storage medium are written in the memory of a function expansion board inserted into the computer or the memory of a function expansion unit connected to the computer, the CPU of the function expansion board or function expansion unit performs some or all of actual processes based on the instructions of the program codes and thereby implements the functions of the above-described embodiments.

The present invention is not limited to the above-described embodiments thereof, and various modifications can be made within the scope of the appended claims.

CLAIM OF PRIORITY

This application claims priority from Japanese Patent Application No. 2004-327892, filed on Nov. 11, 2004, which is hereby incorporated by reference herein.

The invention claimed is:

1. An information acquiring method applied to a system that includes an information acquiring apparatus and a plurality of apparatuses which are connected to a network, the method comprising:
    a detection step of detecting addresses of the plurality of apparatuses connected to the network;
    a forming step of forming a document that includes in a sequential order the addresses detected in the detection step;
    a first transmission step of transmitting the document from the information acquiring apparatus to a first apparatus of the plurality of apparatuses;
    a transfer step of sequentially transferring the document from the first apparatus to a next apparatus of the plurality of apparatuses, in accordance with the sequential order of the detected addresses included in the document, wherein each of the plurality of apparatuses appends information of a self-apparatus to the received document; and
    a second transmission step of transmitting the document from a last apparatus of the plurality of apparatuses, in accordance with the sequential order of the detected addresses included in the document, to the information acquiring apparatus.

2. The information acquiring method according to claim 1, wherein each of the plurality of apparatuses appends information of a self-apparatus to the received document when the self-apparatus has a specific function designated in the received document.

3. The information acquiring method according to claim 1, wherein a function obtained by combining the information of the plurality of apparatuses is appended to the received document.

4. The information acquiring method according to claim 1, wherein a scanner apparatus of the plurality of apparatuses appends a scanner function and a copying function which can be provided by combining the scanner function and a printer function to the received document when the scanner apparatus receives the document to which the printer function is appended.

5. An information acquiring apparatus, connected to a plurality of apparatuses via a network, for acquiring information of the plurality of apparatuses, comprising:
   a detection unit constructed to detect addresses of the plurality of apparatuses connected to the network;
   a forming unit constructed to form a document that includes in a sequential order the addresses detected by the detection unit; and
   a transmission unit constructed to transmit the document formed by the forming unit to a first apparatus of the plurality of apparatuses,
   wherein the document is sequentially transferred from the first apparatus to a next apparatus of the plurality of apparatuses, in accordance with the sequential order of the detected addresses included in the document,
   wherein each of the plurality of apparatuses appends information of a self-apparatus to the received document, and
   wherein the document is transmitted from a last apparatus of the plurality of apparatuses, in accordance with the sequential order of the detected addresses included in the document, to the information acquiring apparatus.

6. The information acquiring apparatus according to claim 5, wherein the forming unit forms a document designating a specific function to acquire information of an apparatus having the specific function.

7. A computer-readable storage medium storing a program that causes a computer, which is connected to a plurality of apparatuses via a network, to execute an information acquiring method for acquiring information of the plurality of apparatuses, the method comprising:
   a detection step of detecting addresses of the plurality of apparatuses connected to the network;
   a forming step of forming a document that includes in a sequential order the addresses detected in the detection step; and
   a transmission step of transmitting the document formed in the forming step to a first apparatus of the plurality of apparatuses,
   wherein the document is sequentially transferred from the first apparatus to a next apparatus of the plurality of apparatuses, in accordance with the sequential order of the detected addresses included in the document,
   wherein each of the plurality of apparatuses appends information of a self-apparatus to the received document, and
   wherein the document is transmitted from a last apparatus of the plurality of apparatuses, in accordance with the sequential order of the detected addresses included in the document, to the information acquiring apparatus.

8. The computer-readable storage medium according to claim 7, wherein the forming step forms a document designating a specific function to acquire information of an apparatus having the specific function.

* * * * *